H. C. PARKHURST.
COTTON GIN.

No. 21,357. Patented Aug. 31, 1858.

Witnesses.

Inventor.

UNITED STATES PATENT OFFICE.

HENRY C. PARKHURST, OF NEW YORK, N. Y.

IMPROVEMENT IN COTTON-GINS.

Specification forming part of Letters Patent No. 21,357, dated August 31, 1858.

*To all whom it may concern:*

Be it known that I, HENRY C. PARKHURST, of the city, county, and State of New York, have invented, made, and applied to use a certain Improvement in Cotton-Gins; and I do hereby declare that the following is a full, clear, and exact description of the construction and operation of the same, reference being had to the accompanying drawings, making part of this specification, wherein—

Figure 1:
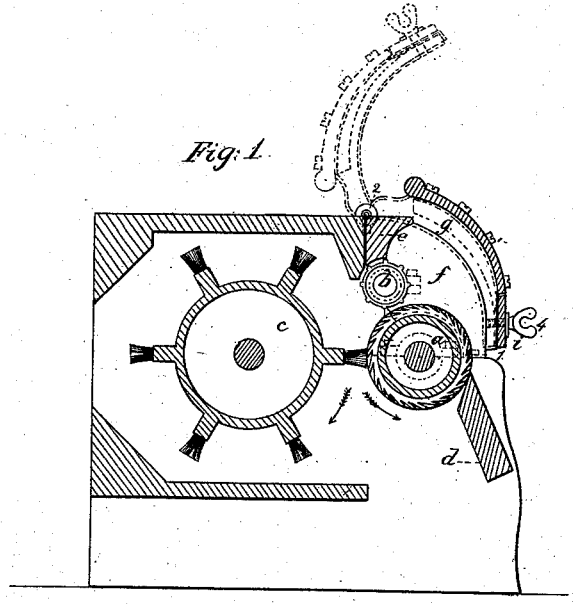
Figure 2:
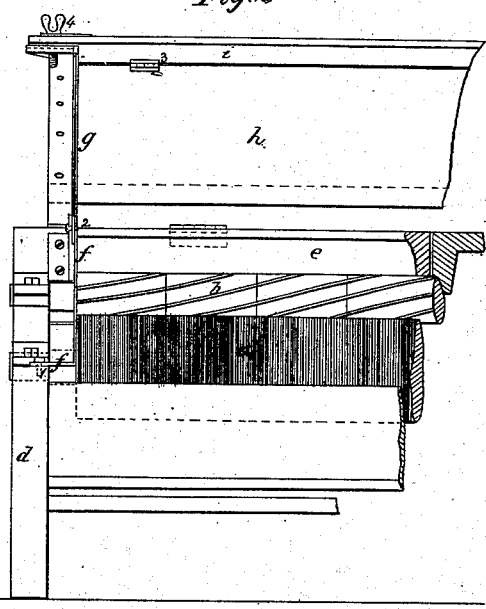

Figure 1 is a vertical section of a cotton-gin with my improvement attached, and Fig. 2 is a side view as with the apron turned up for access to the hopper.

Similar marks of reference denote the same parts.

In cotton-gins in which a cylinder of surface-teeth and a stripper are used it has been usual heretofore to provide a hopper having a breast-board or apron with end pieces, the whole being hinged onto the main frame in such a manner that said hopper can be turned up for the purpose of removing sticks or foreign substances from the roll of cotton on said cylinder. When this hopper is raised, the ends of the cylinder and stripper are exposed, and the cotton often works off and winds around the journals of the cylinder or stripper, and, besides this, any warping or twisting of the breast-board causes the ends of the hopper to become untrue and bind on the cylinders.

The nature of my said invention consists in the application of stationary end pieces to the hopper, combined with movable half end pieces connected with the breast-board and jointed onto the fixed end pieces, whereby the fixed end pieces retain the cotton in the hopper, preventing the same from working over the end of the cylinder and around the journal. At the same time free access is provided for clearing the hopper when required, and any shrinkage or warping of the breast-board does not affect the running of the cylinders.

In the drawings, $a$ is the cylinder, $b$ the stripper, and $c$ the brush, of an ordinary cotton-gin of this general character, and $d$ is the frame, the whole of the parts being of any desired construction. $e$ is the hinged protector over the stripper $c$, as usual. $f$ is the fixed end of the hopper, passing from the upper part of the frame $d$ to the front of said frame at 1, and fitting against the stripper $b$ and cylinder $a$ at each end, so as to allow said cylinder and stripper to run free without friction, but prevent the cotton from working over the ends of said cylinders. $g$ is a movable end piece, attached by the joint 2 to each of the fixed end pieces $f$; and $h$ is the side of the hopper or breast-board attached to and connecting the end pieces $g$, so that when turned up in the position shown in Fig. 2, and in dotted lines in Fig. 1, the attendant can remove any obstructions from the hopper, or when shut down, as shown in Fig. 1, will retain the roll of cotton as it is worked by the cylinder and stripper. The lower edge of the hopper is fitted with a piece, $i$, attached by hinges 3, and adjustable by screws 4, whereby the mouth or opening for the escape of seeds, pods, &c., can be regulated as desired.

I do not claim, generally, a hopper for cotton-gins; neither do I claim the mouth or opening beneath the board $i$, adjustable as set forth; but

What I claim as my invention, and desire to secure by Letters Patent, is—

Constructing the hoppers of cylinder cotton-gins with the fixed end pieces $f$ and movable end pieces $g$ on the breast-board $h$, attached by the joint 2, as and for the purposes set forth.

In witness whereof I have hereunto set my signature this 22d day of June, 1858.

HENRY C. PARKHURST.

Witnesses:
LEMUEL W. SERRELL,
THOMAS G. HAROLD.